Nov. 22, 1960  W. G. KOGEL  2,960,842
ABSORPTION REFRIGERATION
Filed Nov. 12, 1958  2 Sheets-Sheet 1
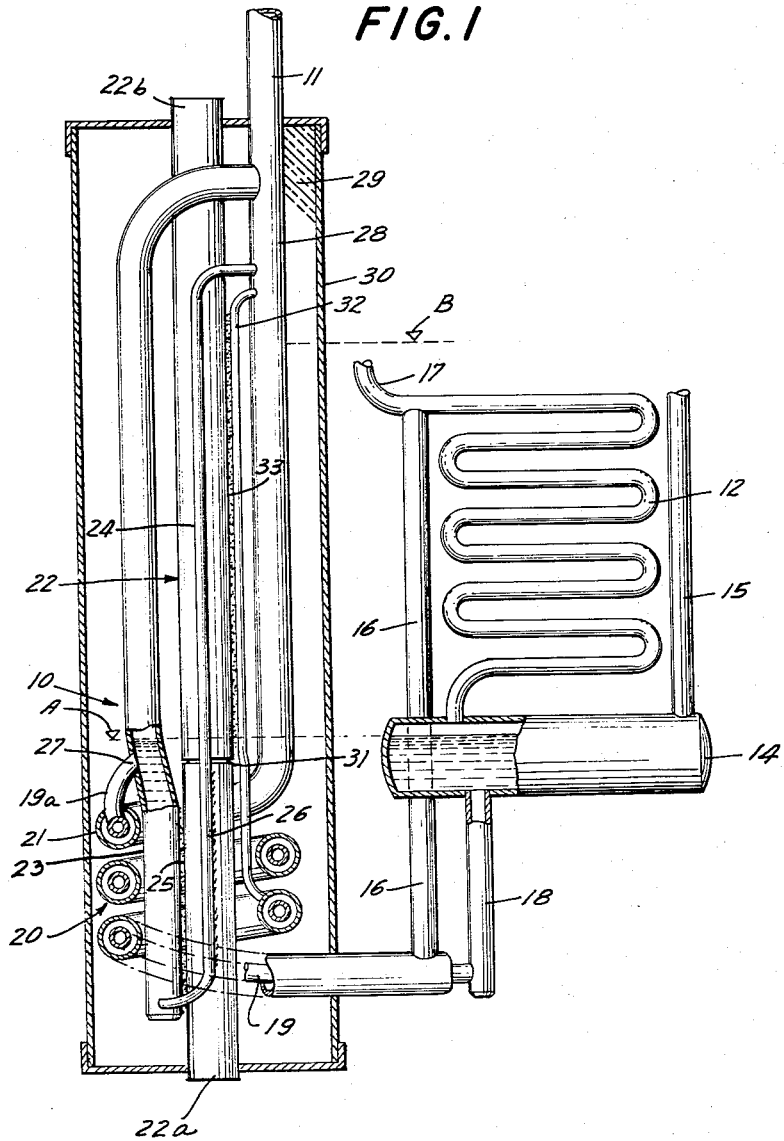
INVENTOR.
Wilhelm Georg Kogel
BY
Edmund A. [signature]
his ATTORNEY

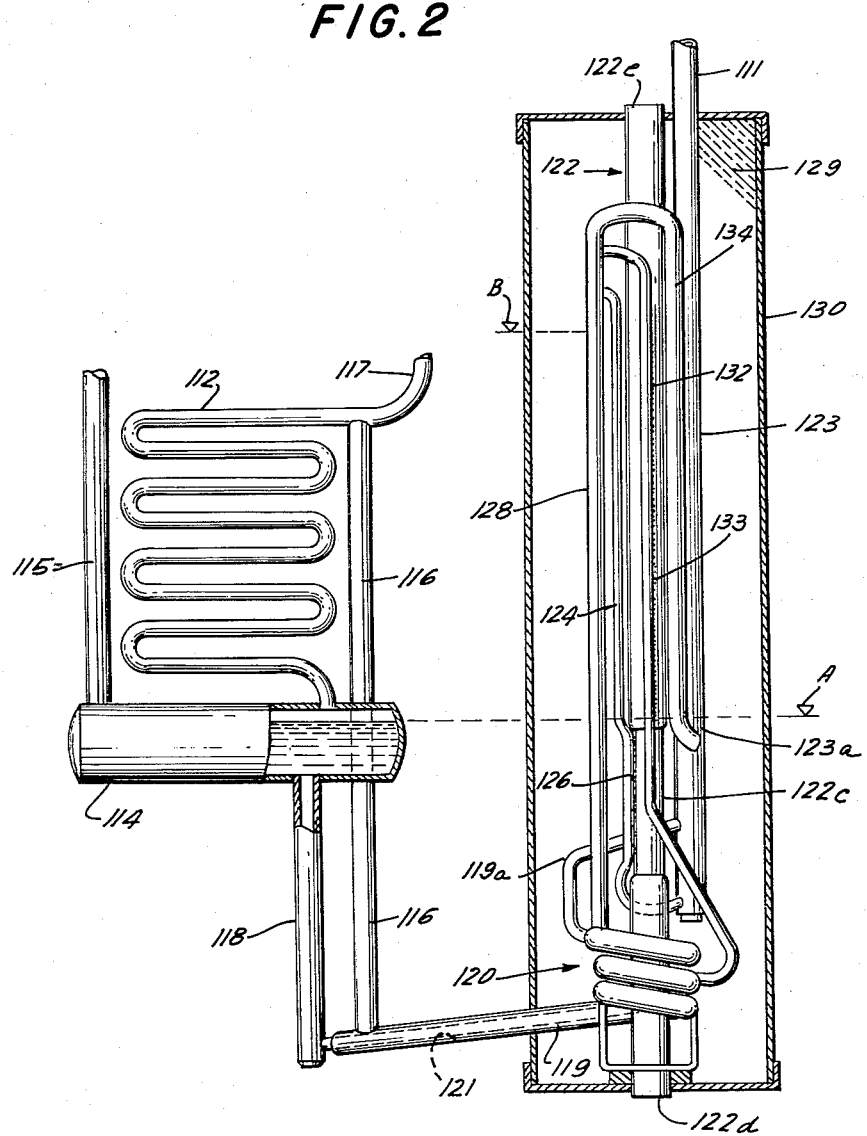

United States Patent Office 2,960,842
Patented Nov. 22, 1960

2,960,842

ABSORPTION REFRIGERATION

Wilhelm Georg Kogel, Stockholm, Sweden, assignor to Aktiebolaget Electrolux, Stockholm, Sweden, a corporation of Sweden Filed Nov. 12, 1958, Ser. No. 773,270

Claims priority, application Sweden Nov. 16, 1957

7 Claims. (Cl. 62—107)

My invention relates to absorption refrigeration systems of the kind in which vapor is expelled out of solution by heating.

It is an object of my invention to provide for absorption refrigeration systems of this type an improvement for efficiently utilizing the heat supplied to the vapor expulsion unit of the system.

Another object of the invention is to recirculate a part of the absorption solution in its circuit to make use of heat supplied to the vapor expulsion unit of the system which otherwise would be lost. I accomplish this by diverting absorption solution from its path of flow from a place of vapor expulsion to a place of absorption, and returning the diverted solution to the place of vapor expulsion. At the place of vapor expulsion I utilize heat which otherwise would be lost to raise the diverted solution from one level to a higher level by vapor-liquid lift action. The raised solution is mixed with absorption solution from which vapor has been expelled at the place of vapor expulsion, and the mixture is conducted in the aforementioned path of flow from the place of vapor expulsion to the place of absorption. Absorption solution is diverted from this path of flow from the mixture, so that a portion of the absorption solution is constantly recirculated through the place of vapor expulsion and never reaches the place of absorption.

The invention, together with the above and other objects and advantages thereof, will be more fully understood upon reference to the following description and the accompanying drawing forming a part of this specification, and in which Fig. 1 illustrates more or less digrammatically an absorption liquid circuit of absorption refrigeration apparatus embodying the invention; and Fig. 2 is a view of refrigeration apparatus like that shown in Fig. 1 illustrating another embodiment of the invention.

In the drawing, the invention is embodied in absorption refrigeration apparatus of a uniform pressure type containing an inert pressure equalizing gas. Refrigerant vapor is expelled from absorption liquid in a generator or vapor expulsion unit 10 by heating and passes through a conduit 11 to a condenser. The refrigerant vapor, such as ammonia, is liquefied in the condenser and flows into an evaporator in which the liquid refrigerant evaporates and diffuses into an inert gas, such as hydrogen, to produce a refrigerating effect. The resulting gas mixture of refrigerant and inert gas flows from the evaporator to an absorber which may be of an air-cooled type including a coil 12 and an absorber vessel 14, such gas entering the absorber vessel through a conduit 15.

In the absorber refrigerant is absorbed from the gas mixture into absorption liquid, such as water, which is delivered thereto through a conduit 16, and the absorption liquid enriched in refrigerant passes into the absorber vessel 14. The inert gas is returned from the absorber to the evaporator in a path of flow including a conduit 17, and the enriched absorption liquid is conducted through a conduit 18 and inner pipe 19 of a liquid heat exchanger 20 to the generator 10. The weakened absorption liquid from which refrigerant vapor has been expelled is conducted from the generator through the outer passage 21 of the liquid heat exchanger 20 and the conduit 16 to the absorber to absorb refrigerant vapor. In order to simplify the drawing, the condenser, evaporator and connections therefore have not been shown, such parts being well known and their illustration not being necessary for an understanding of my invention.

The generator 10 comprises an open-ended heating tube or flue pipe 22 which may be heated in any suitable manner, as by an electrical heating element or a gas or liquid fuel burner, for example, which projects its flame into the lower end of the flue. A boiler pipe 23 and vapor lift pipe or tube 24 extend axially of the heating flue 22 and are secured at 25 and 26, respectively, to the outer surface of the flue in good thermal contact therewith, as by welding.

The liquid heat exchanger 20 in the form of a coil is disposed concentrically about the flue pipe 22 and the upper end 19a of the inner pipe or passage 19 thereof is connected to the boiler pipe 22 at a region 27 below the liquid surface level maintained in the absorber vessel 14. The upper part of the boiler pipe 23 is out of thermal contact with the flue pipe 22 and at its upper end is connected to a standpipe 28 whose upper extension forms the conduit 11 through which expelled vapor passes to the condenser, as previously explained.

To the lower closed end of the boiler pipe 23 is connected the lower end of the vapor lift tube 24 which is in thermal contact at 26 with the flue pipe 22. The upper end of the vapor lift tube 24 communicates with the upper end of the vertically disposed standpipe 28 which is connected at its lower end to the outer passage 21 of the liquid heat exchanger 20.

The parts of the generator just described and liquid heat exchanger 20 are embedded in suitable insulating material 29 contained within a metal casing or shell 30 having openings at the top and bottom through which the open ends of the flue pipe 22 project.

Heating of the tube or flue 22 heats the boiler pipe 23 in thermal contact therewith to heat the enriched absorption solution in the pipe 23 to the boiling temperature and cause expulsion of refrigerant vapor from the absorption liquid. Liquid of decreasing concentration flows downwardly in the pipe 23 and passes into the vapor lift tube 24. Heating of the tube or flue pipe 22 effectively heats the absorption liquid in the vapor lift tube 24 and causes expulsion of vapor therefrom to raise liquid by vapor-liquid lift action into the upper part of the standpipe 28.

Absorption liquid weak in refrigerant flows from the bottom of the standpipe 28 through the outer passage 21 of liquid heat exchanger 20 and conduit 16 to the upper part of the absorber coil 12, as previously explained.

When the refrigeration apparatus just described is operated with an electrical heating element, which may be in the form of a cartridge housing a wire or the like having a relatively high resistance that generates heat when connected to a source of electrical supply, such heating element desirably is inserted within the bottom part 22a of the heating tube. The bottom and top parts 22a and 22b of the heating tube or flue are connected to one another in such a way, as by a few spot welds indicated at 31, that a poor thermal conductive path is provided therebetween. In this way, the bulk of the heat generated by the electrical heating element is effectively utilized along a vertically extending zone which is co-extensive with the thermal connections 25 and 26 between the heating tube and the boiler pipe and vapor-liquid lift tube, and the heat loss resulting from heat flowing to the top part 22b of the heating tube is at a minimum.

When the refrigeration apparatus just described is operated with a gas or liquid fuel burner, on the other hand, the hot products of combustion of the burner flame passing through the heating tube or flue not only heat the bottom flue part 22a but also the top flue part 22b which represents a heat loss.

In accordance with my invention, in order to utilize effectively the hot products of combustion passing through the heating flue 22 when the refrigeration apparatus of Fig. 1 is operated with a fluid fuel burner, heat available at the top flue part 22b is employed to heat weak absoption liquid flowing from the vapor expulsion unit 10. In Fig. 1 a part of the absorption liquid weak in refrigerant and flowing downwardly in the outer passage 21 of liquid heat exchanger 20 is diverted into a vertically disposed tube 32 which is heat conductively connected at 33, as by welding, to the top part 22b of the heating tube or flue.

The hot absorption liquid weak in refrigerant and flowing from standpipe 28 into the upper section of liquid heat exchanger 20 gives up some of its heat to absorption liquid rich in refrigerant and flowing through the inner liquid heat exchanger passage 19 to the boiler pipe 23. After such heat exchange has been effected between absorption liquid weak and rich in refrigerant, respectively, a part of the weak absorption liquid is diverted into the tube 32 in which liquid therein is heated by the top part 22b of the heating tube or flue. Vapor is expelled from liquid in tube 32 to lift or raise liquid therein by vapor-liquid lift action, such raised liquid being conducted to the top part of the standpipe 28 to which the upper end of tube 32 is connected.

The conduit or tube 32 essentially serves as a by-pass in a part of the absorption solution circuit in which some of the absorption liquid is continuously being recirculated to extract as much heat as possible from the heating gases passing through the heating tube or flue 21. In this way, the heating gases discharged from the upper end of the heating flue 22 will be at the lowest temperature possible; and the heat losses, that is, heat conducted axially upward in the top flue part 22b and heat conducted radially therefrom through the insulation 29, will be at a minimum.

The vapor lift tube 24 lifts liquid from the level A in boiler pipe 23 to the level B in standpipe 28 from which liquid flows by gravity to the upper part of the absorber coil 12. It will be seen that liquid is diverted into the lower end of tube 32 from a region of the outer passage 21 of liquid heat exchanger 20 which is below the liquid surface level B in standpipe 28 to which absorption solution is raised through the vapor lift tube 24. Diverted liquid is raised to the upper part of standpipe 28 through the tube 32 in a path of flow which may be referred to as a by-pass and is separate from the circuit in which solution is normally circulated through and between the place of vapor expulsion and place of absorption. Since the liquid level B in standpipe 28 is a relatively short distance below the region to which liquid is raised in the vapor lift tube 32, it is not necessary to expel a considerable quantity of vapor from liquid in tube 32 to effect lifting of liquid by vapor-lift action under the influence of the "reaction head" formed by the liquid column in the standpipe 28. Accordingly, the top part 22b of the heating tube is primarily utilized to expel refrigerant vapor from solution in the lift tube 32, the quantity of absorption liquid vapor that is expelled from solution being at a minimum, so that the concentration of refrigerant in the absorption solution passing from the lower end of standpipe 28 will be reduced further.

Further, the additional heating of absorption liquid flowing through the by-pass tube 32 increases the temperature of the liquid passing from the standpipe 28 into the outer passage 21 of liquid heat exchanger 20, thereby increasing the temperature "head" of weak absorption liquid flowing in thermal exchange relation with rich absorption liquid and effecting an increase in temperature of the rich absorption liquid introduced into the boiler pipe 23.

In Fig. 2 I have shown another embodiment of the invention in which like parts are designated by the same reference numeral with "100" added thereto. In Fig. 2, absorption liquid rich in refrigerant flows from absorber vessel 114 through conduit 118, the inner passage 119 of liquid heat exchanger 120 and connection 119a to generator pipe 123. The extreme lower end of pipe 123 is in communication with the lower end of pump pipe or vapor lift tube 124 which is heat conductively connected at 126 to the heating tube 122. Upward movement is imparted to liquid in the vapor lift pipe 124 by vapor-liquid lift action under the influence of a "reaction head" formed by the liquid column maintained in pipe 123.

Vapor generated in the vapor lift pipe 124 flows from the upper end thereof through the upper part of standpipe 128 and a conduit 134 to a region 123a in pipe 123 which serves as an analyzer and is disposed below the liquid surface level A of the liquid column contained therein, the liquid level A being essentially the same as the liquid surface level in the absorber vessel 114. Absorption liquid from which refrigerant vapor has been expelled flows by gravity from standpipe 128 through the outer passage of liquid heat exchanger 120 and conduit 116 into the upper part of the absorber coil 112.

The embodiment of Fig. 2 differs from that of Fig. 1 described above in that all of the vapor expelled from absorption liquid rich in refrigerant is effected in the vapor lift tube or pump pipe 124 which is thermally connected at 126 to an intermediate part 122c of the heating tube or flue having a bottom section 122d which projects through the bottom opening in the casing 130 and a top section 122e which projects through a top opening in the casing 130. The top and bottom flue pipe sections 122d and 122e are of larger cross-sectional area than the intermediate part 122c and the ends of these flue pipe sections snugly fit over the upper and lower ends, respectively, of the intermediate part 122c.

When the refrigeration apparatus of Fig. 2 is being operated electrically, the top and bottom flue pipe sections 122d and 122e are not needed and the electrical heating cartridge may be positioned within the tube part 122c. The top and bottom flue pipe sections 122d and 122e are employed in the manner shown in Fig. 2 and just described when the refrigeration apparatus is adapted for operation with a fluid fuel burner. In such case, a suitable burner may be employed which can be positioned within the bottom flue pipe section 122d so that the highest temperature heating gases will be made available to effect heating of the intermediate flue part 122c.

In Fig. 2 a part of the absorption liquid weak in refrigerant is diverted from the outer passage 121 of liquid heat exchanger 120 into a vertical tube 132 which is connected at its upper end to the standpipe 128. The tube 132 is heat conductively connected at 133 to the top flue pipe section 122e to lift liquid in the tube and continuously recirculate a part of the weak absorption liquid through the standpipe 128 in the same manner shown in Fig. 1 and described above.

While I have shown and described several embodiments of my invention, it will be apparent that modifications and changes may be made without departing from the spirit and scope of my invention.

I claim:

1. In the art of refrigeration with a system in which absorption solution is normally circulated in its circuit through and between a place of vapor expulsion and a place of absorption, the improvement which comprises the steps of diverting absorption solution from its path of flow in which solution normally flows from the place of vapor expulsion to the place of absorption, raising the diverted solution from one level to a higher level by vapor-liquid lift action at the place of vapor expulsion, mixing such raised diverted solution with absorption solution at the place of vapor expulsion from which vapor has been expelled, and flowing such mixture in said path of flow in which solution normally flows from the place of vapor expulsion to the place of absorption, the improvement which comprises diverting solution from said mixture in said normal path of flow from the place of vapor expulsion to the place of absorption at a region thereof which is below the liquid surface level in said normal path and raising the diverted solution from the one level to the higher level in a by-pass which is separate from the circuit in which solution is normally circulated through and between the place of vapor expulsion and place of absorption, whereby a portion of the absorption solution is constantly being recirculated through the place of vapor expulsion and never reaches the place of absorption.

2. The improvement set forth in claim 1 in which circulation of absorption solution in its circuit is effected by vapor-liquid lift action at the place of vapor expulsion by heating gases passing through a first zone, and in which the diverted solution is raised from the one to the higher level by vapor-liquid lift action at the place of vapor expulsion by the same heating gases passing through a second zone after passing through said first zone.

3. The improvement set forth in claim 2 in which absorption solution in its path of flow to the place of vapor expulsion passes in heat exchange relation with absorption solution in its normal path of flow from the place of vapor expulsion, and absorption solution is diverted from its normal path of flow from the place of vapor expulsion after passing in heat exchange relation with absorption solution in its path of flow to the place of vapor expulsion.

4. In an absorption type refrigerating system comprising an absorption liquid circuit including a generator and an absorber and first conduit means for conducting liquid from said absorber to said generator and second conduit means for conducting liquid from said generator to said absorber, said generator including a vertically disposed heating tube through which a fluid heating medium is adapted to pass upwardly therethrough and a first vapor-liquid lift tube which is thermally connected thereto at a first zone and through which liquid is raised from one level to a higher level by vapor lift action to maintain a liquid body having a liquid surface level which will effect circulation of liquid in said circuit, and a connection in said circuit for diverting liquid from said second conduit means and conducting such liquid to a region above the liquid surface of the liquid body, said connection including a second vapor-liquid lift tube which is thermally connected to said heating tube at a second zone which is above said first zone.

5. Apparatus as set forth in claim 4 in which said first and second zones of said heating tube have a poor heat conductive connection therebetween.

6. Apparatus as set forth in claim 4 in which said first and second conduit means are in heat conductive relation in a lengthwise direction to form a liquid heat exchanger, and said connection for diverting liquid from said second conduit means is connected thereto intermediate the ends of said liquid heat exchanger.

7. Apparatus as set forth in claim 6 in which said generator includes a vertically disposed pipe to the upper part of which is connected the upper ends of both of said vapor-liquid lift tubes, the lower end of said pipe being in communication with said first conduit means.

References Cited in the file of this patent

UNITED STATES PATENTS

| | | |
|---|---|---|
| Re. 18,859 | Maiuri | June 6, 1933 |
| 2,785,543 | Kogel | Mar. 19, 1957 |
| 2,797,557 | Kogel | July 2, 1957 |